Figure 1:
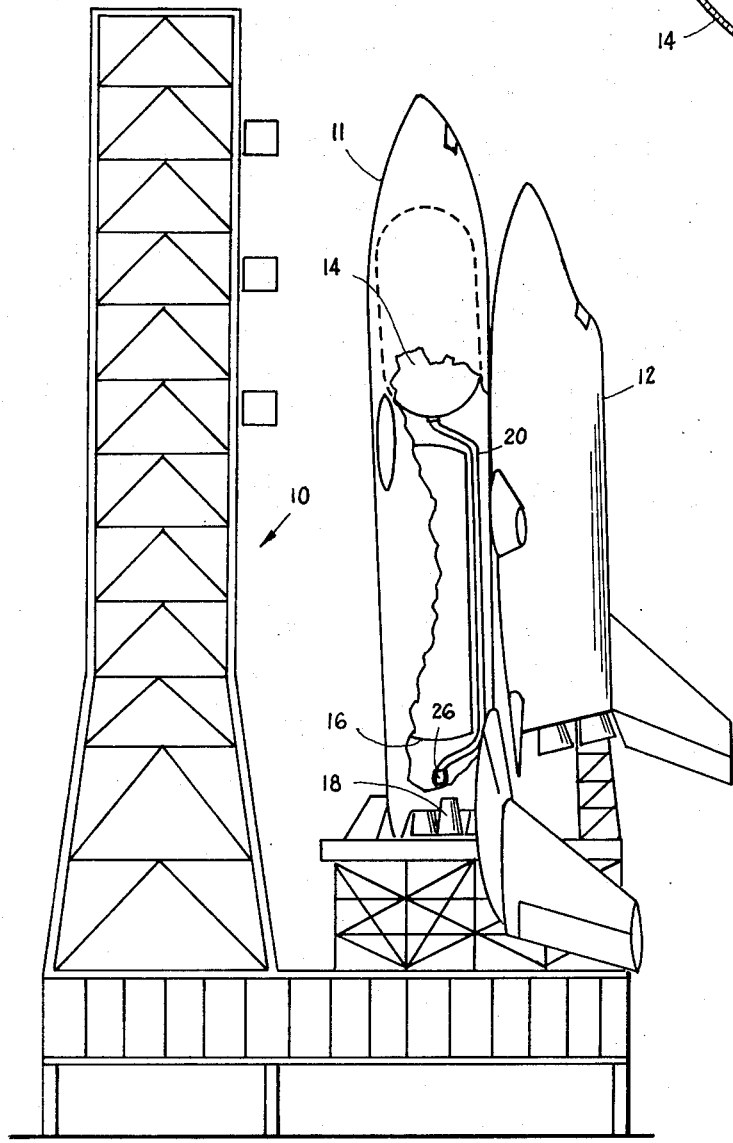

United States Patent

Howard

[15] 3,697,021
[45] Oct. 10, 1972

[54] GEYSERING INHIBITOR FOR VERTICAL CRYOGENIC TRANSFER PIPE

[72] Inventor: Frank S. Howard, Indian Harbor Beach, Fla.

[73] Assignee: The United States of America as represented by the Administrator of the National Aeronautics and Space Administration

[22] Filed: Dec. 31, 1971

[21] Appl. No.: 103,078

[52] U.S. Cl..........................244/1 SB, 62/7, 62/45, 244/135
[51] Int. Cl.............................F25b 19/00
[58] Field of Search............244/1 SB, 135; 62/45, 7; 220/9 LG; 60/39.48, 259, 260

[56] References Cited

UNITED STATES PATENTS 3,425,234  2/1969  Trepaud.....................62/45
3,320,742  5/1967  Truax......................60/39.48
3,321,159  5/1967  Jackson..................244/135 R

OTHER PUBLICATIONS

Ring, E., Rocket Propellant and Pressurization Systems, N.J., Prentice-Hall, 1964, Chapter 11, p. 97–100, by S. K. Morgan and H. F. Brady, Elimination of the Geysering Effect in Missles. TL 783.4

Primary Examiner—Evon C. Blunk
Assistant Examiner—Bruce H. Stoner, Jr.
Attorney—James O. Harrell and John R. Manning

[57] ABSTRACT

A geysering inhibitor utilizing a thin wall tube carried within a vertical pipe which enables convective circulation of a liquid cryogen for preventing the liquid cryogen from geysering as a result of heat input to the vertical pipe.

1 Claim, 3 Drawing Figures

INVENTOR.
FRANK S. HOWARD

BY James O. Harrell

ATTORNEY

GEYSERING INHIBITOR FOR VERTICAL CRYOGENIC TRANSFER PIPE

The invention described herein was made by an employee of the United States Government, and may be manufactured and used by or for the Government for Governmental purposes without the payment of any royalties thereon or therefor.

This invention relates to a geysering inhibitor which utilizes a thin wall tube or pipe within a large vertical transfer pipe which enables convective circulation of the cryogen through the annulus between the pipes so as to prevent geysering of the cryogen.

As space exploration advances it has become apparent that it is necessary to reuse the boosters and space vehicles in order to minimize the enormous cost of such. As a result, a booster and space shuttle is being designed so that both are aerodynamically stable, and after being launched they can re-enter the atmosphere and glide or fly to a landing. In order to make the vehicles aerodynamically stable it is necessary to locate the center of gravity of the vehicle sufficiently forward of the center of pressure. This requires the heavy liquid oxygen tanks to be placed forward or above the liquid hydrogen tanks. Such a configuration requires a long vertical liquid oxygen transfer pipe to extend between the liquid oxygen tank and the main propulsion engines carried adjacent the bottom of the vehicles. A similar liquid oxygen pipe is required on Saturn V first stage vehicles. Heat input from outside the pipe boils liquid oxygen in the vertical pipe at approximately minus 297° Fahrenheit. When boiling starts small bubbles form on the side of the inner wall of the pipe and break away to rise up the pipe. As the bubbles rise, they move towards the center of the pipe where movement resistance is minimum. Lower bubbles in the pipe rise at a more rapid rate than the higher bubbles because the liquid is more dense at lower levels. The bubbles accumulate and form one large bubble which gains in size and velocity as it moves up the liquid oxygen suction pipe. Sufficient energy is provided in the rising bubble to hurl hundreds of pounds of liquid oxygen into the liquid oxygen tank. As the liquid oxygen re-enters the vertical pipe to replace the void produced by the rising bubble, it drops with a tremendous force which may damage the pipe, baffles carried within the tank, the engines carried adjacent the vehicle, or other components utilized therein.

In order to minimize the geysering effect caused by the rising bubble or bubbles, an elongated vertical tube of less diameter than the suction pipe is carried within the suction pipe. In one particular embodiment it has been found that the diameter of the elongated vertical geysering inhibitor pipe has an area approximately equal to the area of the annulus between the inhibitor pipe and the suction pipe.

Accordingly, it is an important object of the present invention to provide an apparatus which will minimize geysering within a cryogenic delivery system.

Another important object of the present invention is to provide an apparatus which can be utilized in cryogenic transfer pipes which incorporates an elongated geysering inhibitor pipe carried on the center-line of the transfer pipe.

Another important object of the present invention is to provide a geysering inhibitor pipe within a vertical transfer pipe for circulating the liquid cryogenic material through the vertical pipe in order to maintain a uniform temperature of the cryogenic material, as well as preventing geysering of the cryogenic material.

Still another important object of the present invention is to provide a device which can be utilized in vertical pipes, such as wells and space vehicles, for producing substantially uniform circulation of the material adjacent the wall of the transfer pipe for preventing overheating of the liquid carried therein.

Figure 2:
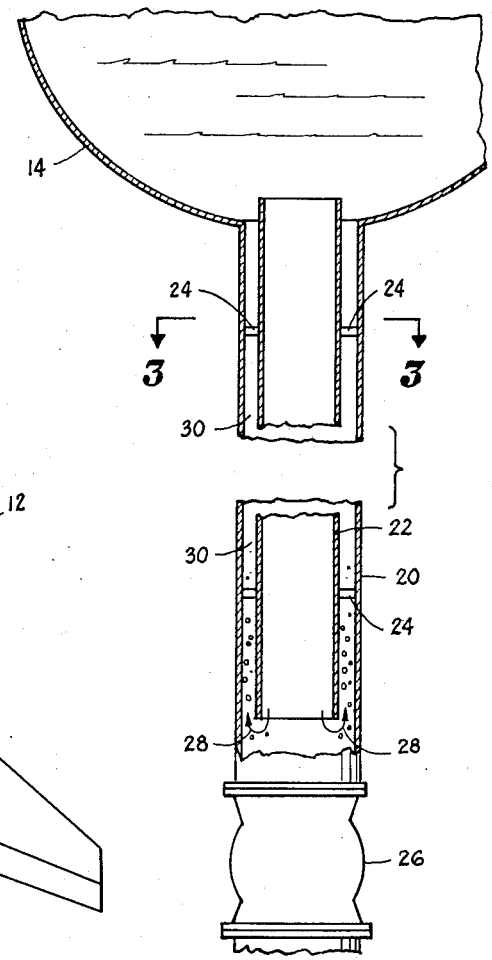
Figure 3:
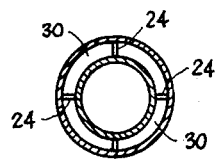

Other objects and advantages will become more apparent from a reading of the following detailed description and appended claims taken into conjunction with the accompanying drawing wherein:

FIG. 1 is a side elevational view, partially in section, showing a space vehicle with a vertical transfer pipe therein, in which a geysering inhibitor is utilized, FIG. 2 is an enlarged sectional elevational view illustrating a geysering inhibitor mounted in a transfer pipe, and FIG. 3 is a cross-sectional view taken along line 3—3 of FIG. 2.

Referring in more detail to FIG. 1 of the drawing, there is illustrated a launch platform, generally designated by the reference character 10, having a booster or space vehicle 11 carried thereon in the launch position. Attached to the booster is an orbitor 12 which will fly through space and after a predetermined period of time re-enter the atmosphere and land.

The booster has a liquid oxygen tank 14 carried adjacent the top thereof, above a liquid hydrogen tank 16. This is to place the center of gravity of the booster above or ahead of the center of pressure in order to make the booster aerodynamically stable. The engines 18 of the booster are carried adjacent the bottom thereof, and communicate with the liquid oxygen tank 14 through the vertical transfer pipe 20. This vertical pipe 20 is filled with liquid oxygen during the liquid oxygen loading process. As a result of the heat transfer from outside the vertical pipe 20 such tends to raise the temperature of the liquid oxygen therein. In order to prevent possible geysering of the liquid oxygen a geysering inhibitor pipe 22 is carried within the vertical pipe 20 on its center-line. The geysering inhibiting pipe 22 is of a smaller diameter than vertical pipe 20 and is attached by horizontal support brackets 24 extending outwardly from the wall thereof to the inner wall of the vertical pipe 20 by any suitable means, such as welding. The support brackets 24 maintain the geysering inhibiting pipe 22 in a uniform spaced relationship to vertical pipe 20. The geysering inhibiting pipe 22 is of substantially the same length as the vertical pipe 20, but terminates above an isolation valve 26 carried in the bottom of the suction pipe for providing a lower passageway 28 between the bottom of the geysering pipe 22 and the isolation valve. The top of the geysering inhibiting pipe 22 extends into the tank 14. This enables the liquid oxygen to flow down the inner passageway of the geysering inhibiting pipe 22 through the lower passageway 28, up through the outer passageway of annulus 30 between the vertical inhibiting tube 22 and the vertical pipe 20 back into the tank 14.

As heat is absorbed from outside the vertical pipe 20 by the cryogenic material it causes the temperature of the cryogenic material carried within outer passageway of the annulus 30 to rise above the temperature of the cryogenic material carried within the inhibiting tube 22. This causes the cryogenic material in outer passageway of the annulus 30 to rise. As the cryogenic material in the annulus rises, cooler cryogenic material flows through the lower passageway 28 replacing such. As a result there is a continuous circulation of the cryogenic material from the liquid oxygen tank 14 downwardly through the inner passageway of geysering inhibiting tube 22 through the passageway 28 upwardly through the annulus 30 back to the liquid oxygen tank 14. This maintains a uniform temperature of the liquid oxygen and prevents geysering from taking place.

The above described system is also a self-regulating system in that the circulation varies according to the heat input. For example, when there is a high heat input the cryogenic material circulates faster than when there is a lower heat input.

While a preferred embodiment of the invention has been described using specific terms, such description is for illustrative purposes only, and it is to be understood that changes and variations may be made without departing from the spirit or scope of the following claims.

I claim:

1. In combination with a space vehicle having an elongated vertical pipe for supplying liquid cryogen from a storage tank to a rocket engine and an isolation valve located in the lower end of said elongated vertical pipe above said rocket engine; an apparatus for inhibiting geysering of said liquid cryogen in said storage tank prior to launch of said space vehicle, comprising:

A. a geysering inhibiting tube of a smaller diameter than said elongated vertical pipe positioned inside of said elongated vertical pipe and extending for substantially the full length thereof;
B. bracket means for supporting said geysering inhibiting tube on the inner wall of said elongated vertical pipe in a uniform spaced relationship thereto;
C. said elongated vertical pipe and said geysering inhibiting tube defining inner and outer passageways extending substantially the full distance between said storage tank and said isolation valve;
D. said outer passageway having approximately the same flow area as that of said inner passageway;
E. said geysering inhibiting tube terminating above said isolation valve for allowing said liquid cryogen to flow from said inner passageway around the bottom thereof into said outer passageway when said isolation valve is closed;
F. whereby as heat is absorbed by said liquid cryogen from outside said elongated vertical pipe, such causes said liquid cryogen to flow continuously from said storage tank down through said inner passageway, around the bottom of said geysering inhibiting tube, up through said outer passageway and then back into said storage tank to prevent small gas bubbles formed in said liquid cryogen from coalescing and reaching the center of said elongated vertical pipe to form a large bubble that would otherwise result in a geysering of said liquid cryogen in said storage tank.

* * * * *